US012115648B1

(12) United States Patent
Schnacky

(10) Patent No.: US 12,115,648 B1
(45) Date of Patent: Oct. 15, 2024

(54) PORTABLE MAGNETIC TOOL ORGANIZER

(71) Applicant: Cory Schnacky, Rice Lake, WI (US)

(72) Inventor: Cory Schnacky, Rice Lake, WI (US)

( * ) Notice: Subject to any disclaimer, the term of this patent is extended or adjusted under 35 U.S.C. 154(b) by 0 days.

(21) Appl. No.: 18/082,504

(22) Filed: Dec. 15, 2022

(51) Int. Cl.
*B25H 3/00* (2006.01)
*B25H 3/02* (2006.01)

(52) U.S. Cl.
CPC ............ *B25H 3/003* (2013.01); *B25H 3/021* (2013.01)

(58) Field of Classification Search
CPC ................................ B25H 3/021; B25H 3/003
USPC .......................................................... 206/350
See application file for complete search history.

(56) References Cited

U.S. PATENT DOCUMENTS 4,826,059 A * 5/1989 Bosch .................... A45C 11/24 211/DIG. 1
5,520,285 A * 5/1996 Mursch .................. B25H 3/003 206/45.24
5,544,747 A * 8/1996 Horn ......................... B25H 3/06 211/DIG. 1
D374,984 S * 10/1996 Scott .............................. D3/228
5,760,668 A * 6/1998 Testa .................... B23Q 3/1546 211/DIG. 1
6,571,966 B1 * 6/2003 Hsiao .................... A47F 7/0028 206/379
6,702,112 B1 * 3/2004 Henderson ............. B65D 85/20 224/904
7,225,923 B2 * 6/2007 Hallee .................... B25H 3/003 206/379
8,069,984 B2 * 12/2011 Larson .................. B25H 3/023 206/372
9,763,510 B1 * 9/2017 Miner ....................... A45F 5/02
10,052,754 B1 * 8/2018 Coleman, Jr. ............ B25H 3/04
10,183,394 B1 * 1/2019 Dagnan, III ........... B65D 25/10
10,207,401 B1 * 2/2019 Pedrin .................... B25H 3/003
10,315,256 B1 * 6/2019 Stephenson, Jr. .......... B25F 5/02
11,077,545 B2 * 8/2021 Christen ................ B25H 3/003
11,453,113 B1 * 9/2022 Hsieh ....................... B25H 3/06
2003/0006157 A1 * 1/2003 Vasudeva ................. B25H 3/02 206/443
2003/0180105 A1 * 9/2003 Hsiao ..................... B25H 3/003 407/120
2004/0050735 A1 * 3/2004 Coleman, Jr. .......... B25H 3/003 206/378
2006/0283739 A1 * 12/2006 Wang ..................... B25H 3/003 206/372
2008/0017537 A1 * 1/2008 Inskeep .................... A45C 5/03 220/555
2009/0050657 A1 * 2/2009 Woolery ................... A45F 5/00 224/267
2009/0218302 A1 * 9/2009 Winnard ................ B25H 3/003 211/70.6

(Continued)

*Primary Examiner* — Ernesto A Grano
(74) *Attorney, Agent, or Firm* — Jay B. Bell

(57) ABSTRACT

A tool organizer for transporting a plurality of tools for which multiple sizes and/or types may be needed during a particular job, including but not limited to (and by way of example only) drill bits, screwdrivers, wrenches, sockets, and the like. The tool organizer of the present disclosure comprises a first compartment hingedly coupled with a second compartment such that the tool organizer is moveable between a first, closed position in which the tools inside the tool organizer are prevented from falling out and a second, open position in which the tools inside the tool organizer are accessible to a user.

13 Claims, 4 Drawing Sheets

(56) References Cited

U.S. PATENT DOCUMENTS

| | | | | |
|---|---|---|---|---|
| 2011/0005944 | A1* | 1/2011 | Woolery | B65D 73/0014 206/525 |
| 2014/0165293 | A1* | 6/2014 | Hermansen | B25B 27/0071 7/168 |
| 2015/0122750 | A1* | 5/2015 | Kao | B25H 3/003 211/13.1 |
| 2017/0188722 | A1* | 7/2017 | Winnard | A47F 7/0021 |
| 2018/0311810 | A1* | 11/2018 | Larsson | A45F 5/021 |
| 2019/0191839 | A1* | 6/2019 | Aquino | B25H 3/02 |
| 2019/0283233 | A1* | 9/2019 | Kukucka | B25H 3/06 |
| 2020/0094396 | A1* | 3/2020 | Steiner | B25H 3/003 |
| 2022/0410363 | A1* | 12/2022 | Cacciabeve | B25B 13/56 |
| 2023/0061938 | A1* | 3/2023 | Evatt | B25H 3/003 |

* cited by examiner

PORTABLE MAGNETIC TOOL ORGANIZER

FIELD

The present disclosure relates generally to tools, and more particularly to a tool organizer with magnetic features.

BACKGROUND

Toolboxes are generally used to store a variety of tools. Some toolboxes are large and have multiple compartments or drawers for storing a wide variety of tools. Other toolboxes may be compact, portable, and store only one type of tool. With certain tools, for example drill bits, screwdrivers, socket wrenches, etc., it may be advantageous for a user to be able to transport a kit containing a variety of sizes and shapes of the same type of tool. Further, it may be advantageous for these toolboxes to securely organize the tools so that a user may quickly find the precise tool they are need to perform a task.

SUMMARY

The tool organizer of the present disclosure is ideal for transporting a plurality of tools for which multiple sizes and/or types may be needed during a particular job, including but not limited to (and by way of example only) drill bits, screwdrivers, wrenches, sockets, and the like. By way of example, the tool organizer of the present disclosure comprises a first compartment hingedly coupled with a second compartment such that the tool organizer is moveable between a first, closed position in which the tools inside the tool organizer are prevented from falling out and a second, open position in which the tools inside the tool organizer are accessible to a user.

In some embodiments, the compartments may each have one or more tool holders having a plurality of storage slots configured to securely store tools in an organized fashion until use. In some embodiments, the tool holders may have a magnetic element associated therewith to magnetically hold metal tools within the tool slots to ensure organization during transport. In some embodiments, at least one compartment may include a working area comprising an open area configured to temporarily hold tools until the user has time to replace the tools in their proper slots on the tool holders. In some embodiments, the working area may include a large magnet or magnetized surface to magnetically hold metal tools in place. In some embodiments, the large magnet or magnetized surface may be removable so that the magnet may be removed before moving the tool organizer into a closed position.

BRIEF DESCRIPTION OF THE DRAWINGS

Many advantages of the present disclosure will be apparent to those skilled in the art with a reading of this specification in conjunction with the attached drawings, wherein like reference numerals are applied to like elements and wherein.

DETAILED DESCRIPTION OF A PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The portable magnetic tool organizer and related methods disclosed herein boasts a variety of inventive features and components that warrant patent protection, both individually and in combination.

Figure 1:
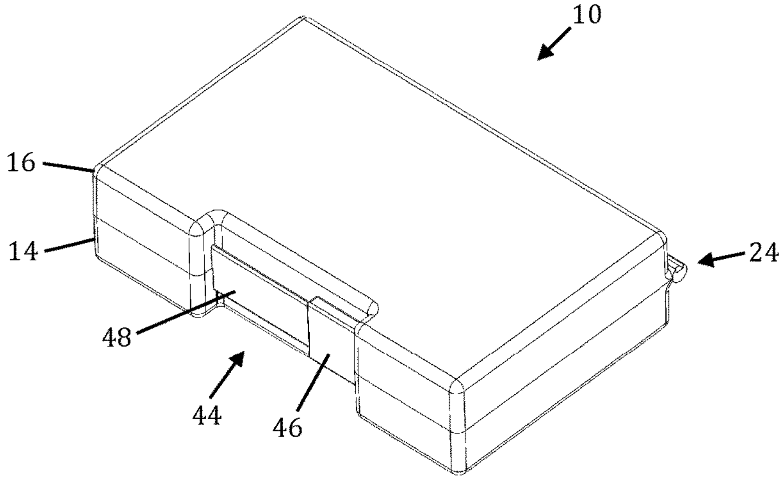
FIG. 1 is a perspective view of an example of a portable tool organizer shown in a closed configuration, according to some embodiments.
Figure 2:
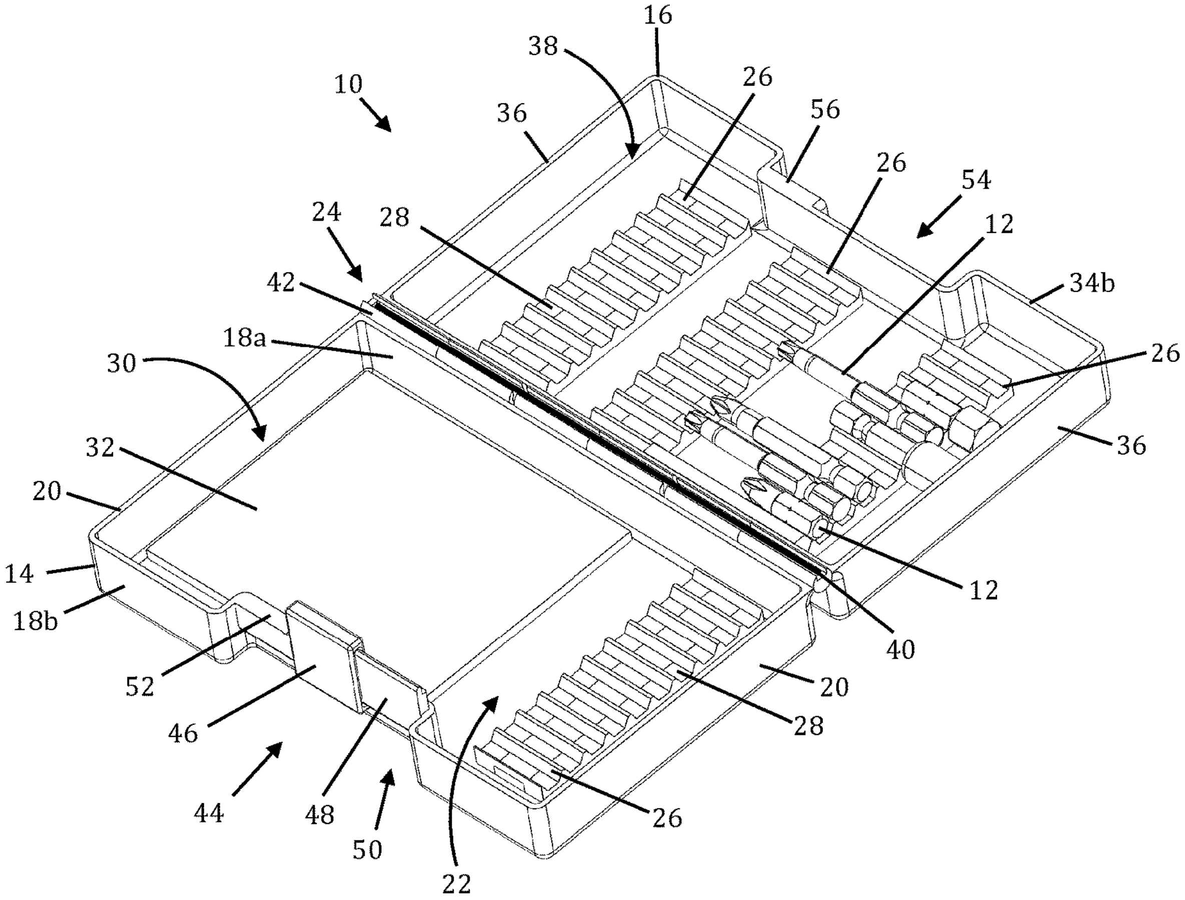
FIG. 2 is a perspective view of the portable tool organizer of FIG. 1 shown in an open configuration, according to some embodiments.
Figure 3:
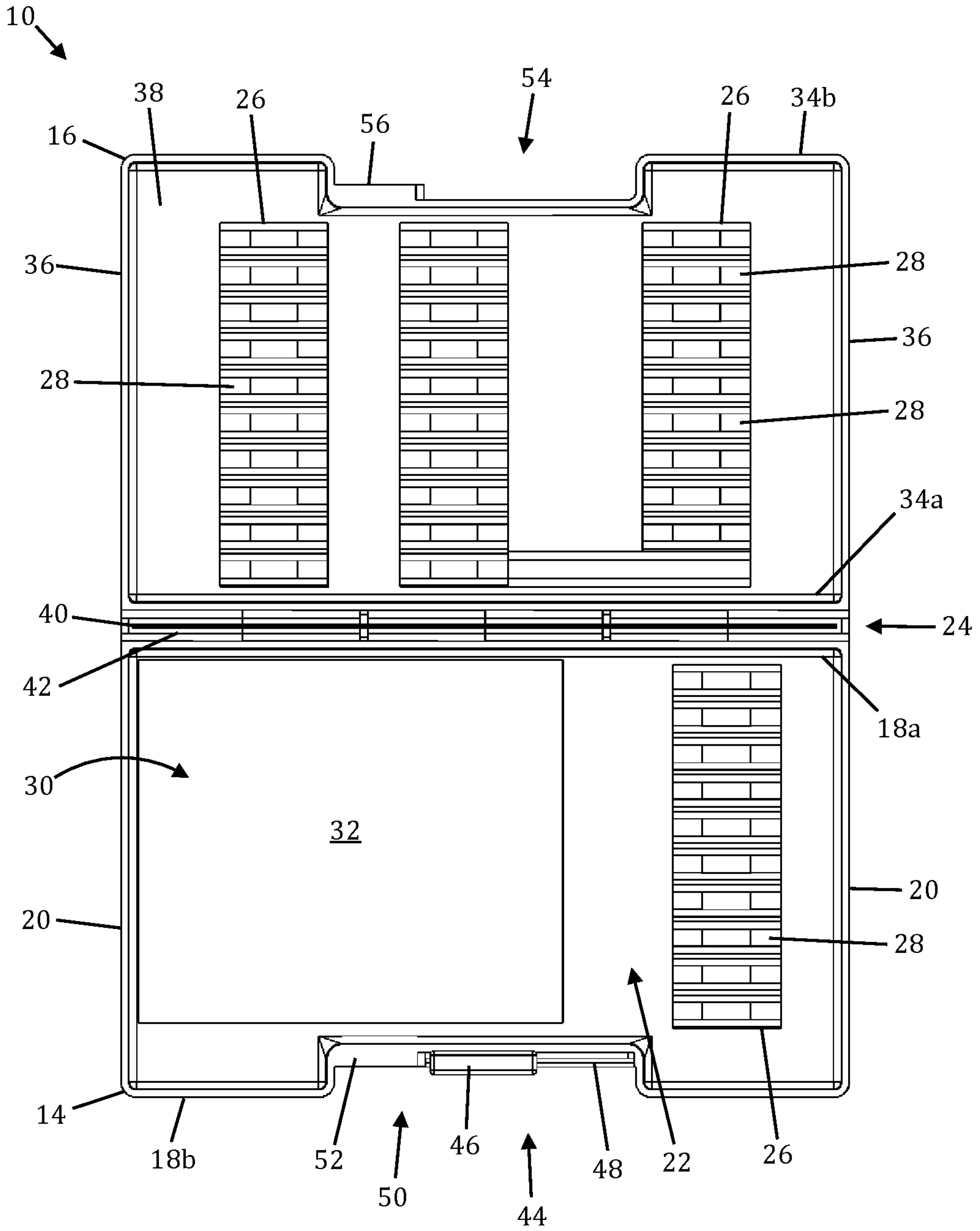
FIG. 3 is a plan view of the portable tool organizer of FIG. 1 shown in an open configuration, according to some embodiments.
Figure 4:
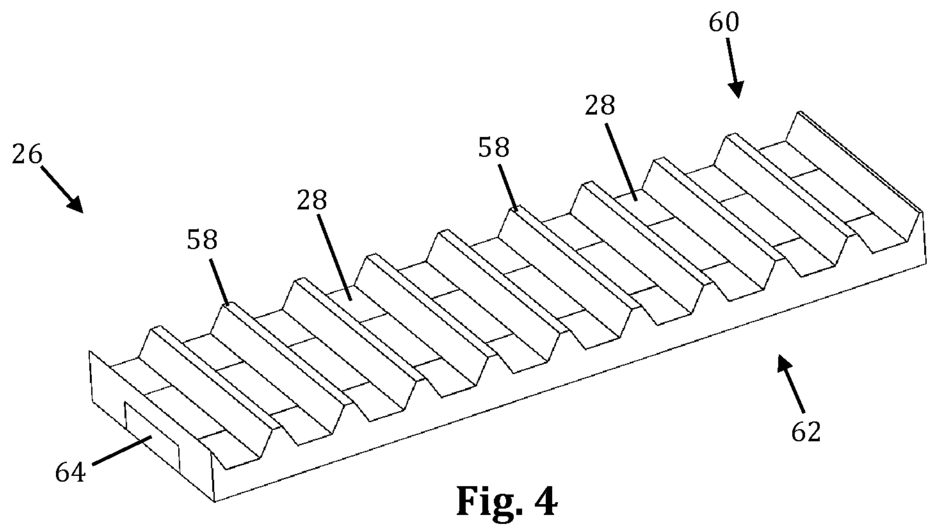
FIG. 4 is a perspective view of an example of a tool holder with a magnetic element forming part of the portable tool organizer of FIG. 1, according to some embodiments.
Figure 5:
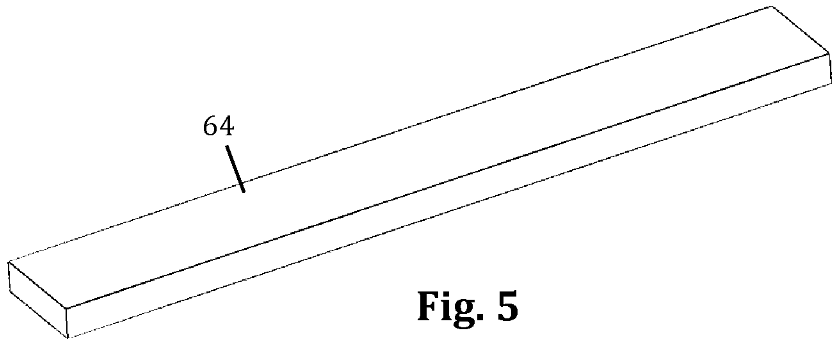
FIG. 5 is s a perspective view of an example of a magnetic element forming part of the portable tool organizer of FIG. 1, according to some embodiments.
Figure 6:
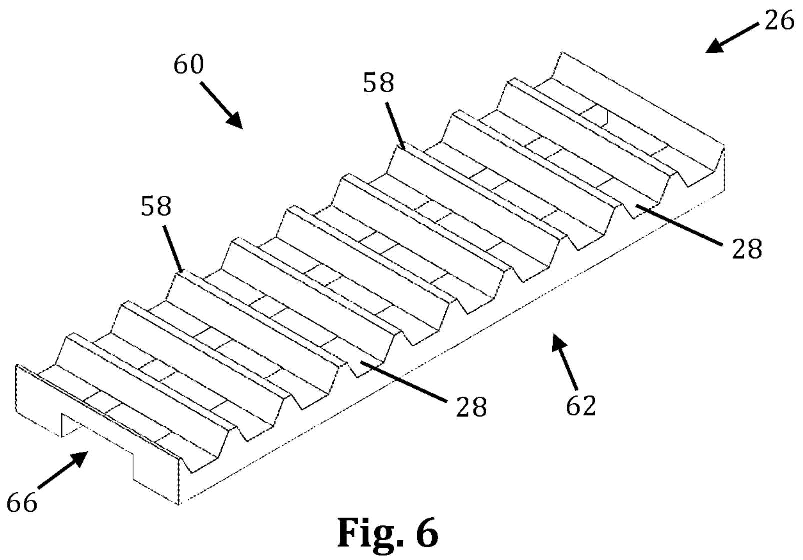
FIG. 6 is a perspective view of a tool holder forming part of the portable tool organizer of FIG. 1, according to some embodiments.
Figure 7:
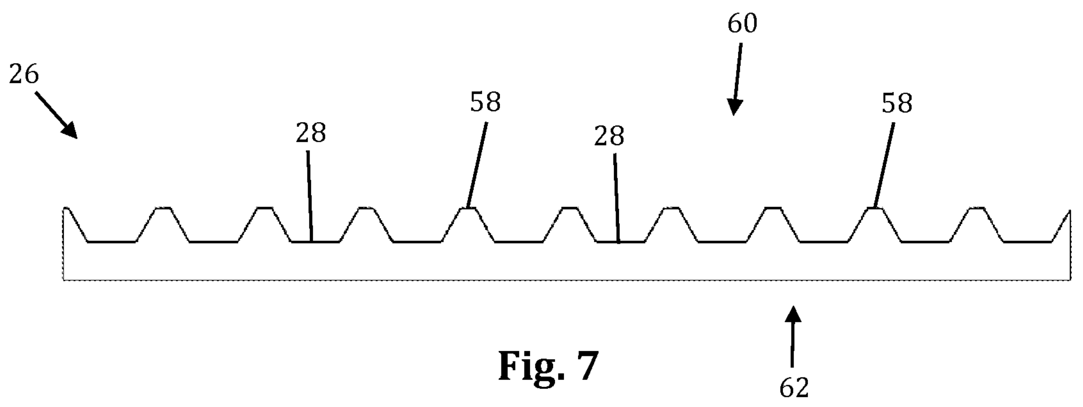
FIG. 7 is a side plan view of the tool holder of FIG. 6, according to some embodiments.
Figure 8:
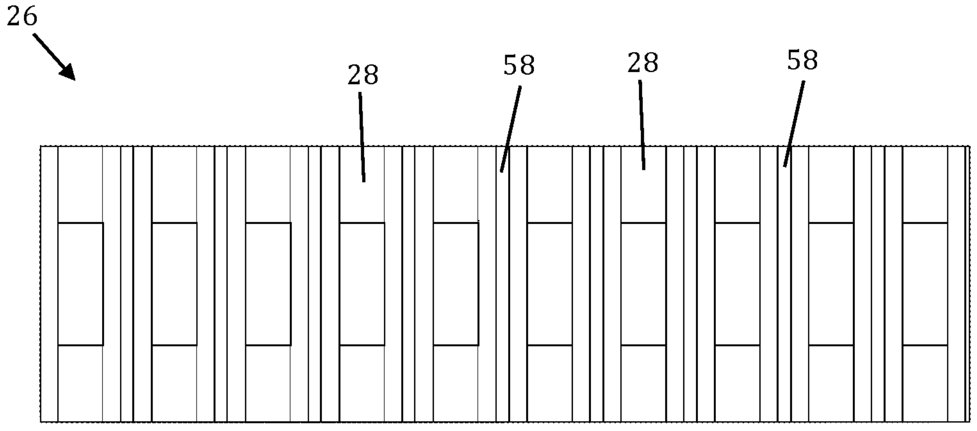
FIG. 8 is a top plan view of the tool holder of FIG. 6, according to some embodiments.
Figure 9:
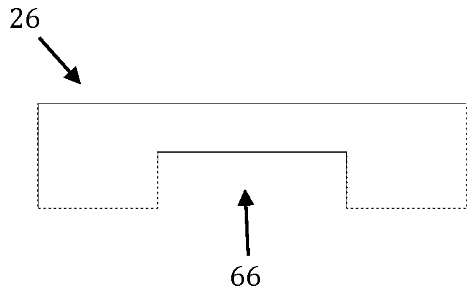
FIG. 9 is an end plan view of the tool holder of FIG. 6, according to some embodiments.

FIGS. 1-3 illustrates one example of a portable magnetic tool organizer 10 according to one embodiment of the disclosure. The tool organizer 10 of the present disclosure enables a user to easily transport a variety of tools 12 while maintaining an organization of said tools 12 such that the tools 12 are easily accessible when needed. In some embodiments, the tool organizer 10 of the present example embodiment includes a first compartment 14 hingedly coupled with a second compartment 16 such that the tool organizer 10 is moveable between a first, closed position (e.g., as shown in FIG. 1) in which the tools 12 inside the tool organizer are prevented from falling out and a second, open position (e.g., as shown in FIG. 2) in which the tools 12 inside the tool organizer are accessible to a user. By way of example only, the tool organizer 10 is shown and described herein as adapted for securely transporting a variety of drill bits 12, however the tool organizer 10 may be provided in different sizes and configurations to enable a user to securely transport larger tools such as screwdrivers and/or wrenches, etc.

In some embodiments, the first compartment 14 may have a generally rectangular shape having a pair of opposing first sidewalls **18*a*, 18*b* and a pair of opposing second sidewalls 20 that cooperate to form a first receptacle 22 therebetween, such that the first receptacle 22 has an area defined by the pairs of opposing first and second sidewalls. By way of example only, in the instant embodiment in which the tool organizer 10 has a generally rectangular shape, one or more hinge elements 24 configured to hingedly connect the first compartment 14 to the second compartment 16 may be positioned on the first sidewall 18***a*, which may be a long sidewall of the rectangular shape. In some embodiments, the first sidewalls 18*a* (including the hinge element 24), 18*b* may be the short sidewalls of the rectangular shape. In some embodiments, the tool organizer 10 may have a shape other than rectangular, including but not limited to square, triangular, semi-circular, pentagonal, hexagonal, etc. In any embodiment, the first compartment 14 will have a hinge element 24 positioned on a generally straight edge (e.g., first sidewall 18*a*) that is complementary to a generally straight edge of the second compartment 16 so that the tool organizer 10 may hingedly transition between open and closed positions.

In some embodiments, the first compartment 14 may have one or more tool holders 26 having a plurality of storage slots 28 configured to securely store tools in an organized fashion until use, and a generally planar working area 30 comprising an uninterrupted open area configured to temporarily hold tools until the user has time to replace the tools 12 in their proper slots 28 on the tool holders 26. In some embodiments, the working area 30 may occupy more than half of the area of the first receptacle 22, for example as shown in FIG. 3. In some embodiments, the working area 30 may include a large magnet or magnetized surface 32 to magnetically hold metal tools 12 in place. In some embodiments, the large magnet or magnetized surface 32 may occupy more than half of the area of the first receptacle 22, for example as shown in FIG. 3. In some embodiments, the large magnet or magnetized surface 32 may be removable so that the magnet may be removed before moving the tool organizer 10 into a closed position and installed after moving the tool organizer 10 into an open position. In some embodiments, the removable large magnet may attach to the outside of the tool organizer 10 when the tool organizer 10 is in a closed position. In some embodiments, the removable large magnet may be attached to the outside of the tool organizer 10 by way of slots, snap-fit, adhesive, magnetic interaction, or any other suitable method of removably coupling the removable large magnet to the outside of the tool organizer 10.

In some embodiments, the second compartment 16 may have one or more tool holders 26 having a plurality of storage slots 28 configured to securely store tools in an organized fashion until use. The number of tool holders 26 provided within the second compartment 16 may vary depending upon the types of tools 12 that are being securely transported. For example, in the instant embodiment shown in FIGS. 1-3, the tool organizer 10 is provided with three tool holders 26 in the second compartment 16, since the tool organizer 10 of the present example embodiment is configured to securely transport a set of drill bits. In some embodiments, the second compartment 16 may have only one tool holder 26, for example in a tool organizer 10 configured to securely transport a set of screwdrivers.

In some embodiments, the second compartment 16 may have a generally rectangular shape having pair of opposing first sidewalls 34*a*, 34*b* and a pair of opposing second sidewalls 36 that cooperate to form a second receptacle 38 therebetween. By way of example only, in the instant embodiment in which the tool organizer 10 has a generally rectangular shape, one or more hinge elements 24 configured to hingedly connect the second compartment 16 to the second compartment 16 may be positioned on the first sidewall 34*a*, which may be a long sidewall of the rectangular shape. In some embodiments, the first sidewalls 34*a* (including the hinge element 24), 34*b* may be the short sidewalls of the rectangular shape. In some embodiments, the tool organizer 10 may have a shape other than rectangular, including but not limited to square, triangular, semi-circular, pentagonal, hexagonal, etc. In any embodiment, the second compartment 16 will have a hinge element 24 positioned on a generally straight edge (e.g., first sidewall 34*a*) that is complementary to a generally straight edge of the second compartment 16 so that the tool organizer 10 may hingedly transition between open and closed positions.

In some embodiments, the hinge element 24 may comprise an elongated pin 40 captured within complementary pin housings 42 provided on the first and second compartments 14, 16 (e.g., on the first sidewall 18*a* of the first compartment 14 and the first sidewall 34*a* of the second compartment 16), wherein the pin 40 provides an axis around which the compartments pivot. In some embodiments, the first and second compartments 14, 16 may have any suitable number of complementary pin housings 42. In some embodiments, the elongated pin 40 may comprises a plurality of elongated pins 40. In some embodiments, the hinge element 24 may comprise a deformable unitary connector attached to or formed continuously between the first and second compartments 14, 16. In some embodiments, the hinge element 24 may comprise one or more ball and socket connectors that allow pivoting of the first and second compartments 14, 16 away from one another.

In some embodiments, the tool organizer 10 of the present disclosure may include a locking element 44 configured to maintain the tool organizer 10 in the closed position during transport and/or storage. In some embodiments, the locking element 44 may comprise a sliding member 46 positioned on a track 48, as shown by way of example only in FIGS. 1-3. By way of example, the track 48 may be positioned within a recessed portion 50 of the second sidewall 18*b* of the first compartment 14. In some embodiments, the recessed portion 50 includes a first shelf 52 positioned adjacent to the track 48 such that one edge of the shelf 52 is continuous with one edge of the track 48 and configured to engage with the sliding element 46 when the tool organizer 10 is in the closed position. In some embodiments, the second sidewall 34*b* of the second compartment 16 may have a recessed portion 54 and shelf 56 that is complementary to the recessed portion 50 and shelf 52 of the first compartment 14 such that, when the tool organizer 10 is in a closed position, the shelf 52 is aligned with and flushly abuts shelf 56. By way of example, shelf 56 has an edge configured to engage with the sliding element 46 when the tool organizer 10 is in the closed position. By way of example only, when the tool organizer 10 is in the closed position, the sliding element 46 may slide along the track 48 between a first position in which the sliding element 46 is positioned only on the track 48 (and the tool organizer 10 is unlocked) and a second position in which the sliding element 46 is positioned on the shelf 52 and shelf 56, capturing the shelves 52, 56 within the sliding element 46 and thereby locking the tool organizer 10 in the closed position. In some embodiments, an alternative locking mechanism may be used, including but not limited to (and by way of example only) a clip, snap, spring-loaded lock, or any suitable mechanism that securely holds the tool organizer 10 in a closed configuration.

FIGS. 4-9 illustrate an example of a tool holder 26 provided the tool organizer 10 described above, according to some embodiments. By way of example, the tool holder 26 shown and described herein is representative of the tool holders 26 shown in tool organizer 10 disclosed above, although it should be understood that not all of the tool holders 26 need to be identical to one another, as the tool holder 10 may be configured to hold a variety of tool types and thus would be provided with a variety of tool holders 26, each configured to hold a specific type of tool.

In some embodiments, the tool holder 26 may be an elongated member having a generally rectangular shape and a longitudinal axis, and a plurality of slots 28 formed transverse to the longitudinal axis and separated by slot dividers 58, each slot 28 configured to hold a distinct tool 12. By way of example only, the tool holder 26 may have a front or top side 60 and a back or bottom side 62. In some embodiments, the slots 28 are positioned on the top side 60.

In some embodiments, the slots 28 may have a cross-sectional shape corresponding to the cross-sectional shape(s) of the tool(s) that the tool holder 26 is intended to securely hold. For example, the tool holder 26 of the instant embodiment is configured to hold a variety of drill bits 12. Consequently, each slot 28 may have a semi-hexagonal cross-sectional shape (e.g., best viewed in FIG. 7) to match the shape of standard drill bits. This enables the tool holder 26 to limit movement of the tools 12 during transport, for example.

In some embodiments, the tool holder 26 may further comprise at least one magnetic element 64 configured to magnetize the tool holder 26 to securely hold metal tools in place during transport. In some embodiments, the tool holder 26 may further include at least one recess 66 provided on the back side 62 of the tool holder 26 and configured to snugly receive the at least one magnetic element 64 therein. In the embodiment shown by way of example in FIGS. 1-9, the magnetic element 64 is a single generally rectangular bar magnet provided within a generally rectangular elongated recess 66. In some embodiments, the tool holder 26 may have a plurality of magnetic elements 64 which may have different shapes, for example including but not limited to circular, triangular, square, oval, etc. In any embodiment, the number and shape(s) of the recess(es) 66 provided on each tool holder 26 will correspond to the number and shape(s) of the magnetic element(s) 64 provided.

By way of example only, the magnetic field of each magnetic element 64 may be increased or decreased depending upon the needs of the user. In some embodiments, one or more of the alignment, orientation, and size of the magnetic element(s) 64 may be altered to achieve the desired strength and direction of the magnetic attraction between the magnetic elements 64 and the tools 12.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A portable magnetic tool organizer, comprising:
- a first tool storage compartment including a pair of opposing first sidewalls and a pair of opposing second sidewalls that cooperate to form a first receptacle therebetween, the first receptacle having an area defined by the pairs of opposing first and second sidewalls, the first receptacle further having at least one magnetic tool holder positioned therein, the magnetic tool holder having a plurality of tool slots formed therein, each tool slot configured to securely hold a single tool, and a working area comprising a generally planar surface configured to temporarily receive one or more tools therein when not secured in a respective tool slot, wherein the working area occupies more than half of the area of the first receptacle, wherein the working area comprises a magnetized surface; and
- a second tool storage compartment including a second receptacle having at least two magnetic tool holders positioned therein, each of the magnetic tool holders having a plurality of tool slots formed therein;
- wherein the first tool storage compartment is hingedly coupled to the second tool storage compartment such that the tool organizer is moveable between a first, closed position in which the tools inside the tool organizer are prevented from falling out and a second, open position in which the tools inside the tool organizer are accessible by a user.

2. The portable magnetic tool organizer of claim 1, wherein the working area comprises a removable magnet.

3. The portable magnetic tool organizer of claim 2, wherein the removable magnet occupies more than half of the area of the first receptacle.

4. The portable magnetic tool organizer of claim 1, wherein each of the magnetic tool holders have a front side, a back side, an elongated rectangular shape, and a longitudinal axis extending the length of the tool holder.

5. The portable magnetic tool organizer of claim 4, wherein each of the plurality of slots are formed within the front side of the magnetic tool holder transverse to the longitudinal axis.

6. The portable magnetic tool organizer of claim 4, wherein each of the plurality of slots are sized and configured to securely hold a drill bit.

7. The portable magnetic tool organizer of claim 4, wherein each of the plurality of slots has a semi-hexagonal cross section.

8. The portable magnetic tool organizer of claim 4, wherein each of the magnetic tool holders has an elongated recess formed within the back side of the magnetic tool holder.

9. The portable magnetic tool organizer of claim 8, further comprising a bar magnet positioned within the elongated recess formed within the back side of the magnetic tool holder.

10. The portable magnetic tool organizer of claim 1, further comprising a locking element configured to maintain the tool organizer in the closed position during transport or storage.

11. The portable magnetic tool organizer of claim 10, wherein the locking element comprises a moveable member positioned on a track.

12. The portable magnetic tool organizer of claim 11, wherein the movable member is movable between an unlocked position in which the moveable member is in contact with only one of the first and second compartments, and a locked position in which the movable member is in contact with both of the first and second compartments.

13. The portable magnetic tool organizer of claim 1, wherein the magnetized surface occupies more than half of the area of the first receptacle.

* * * * *